(12) United States Patent
Landess et al.

(10) Patent No.: US 6,226,146 B1
(45) Date of Patent: May 1, 2001

(54) MULTI-POINT INTERFERENCE DISC SPACER FOR A DISC DRIVE

(75) Inventors: James D. Landess, San Jose; Keith F. Wood, Sunnyvale, both of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/226,466

(22) Filed: Jan. 7, 1999

Related U.S. Application Data
(60) Provisional application No. 60/070,848, filed on Jan. 8, 1998.

(51) Int. Cl.[7] ................................................. G11B 17/08
(52) U.S. Cl. ...................................... 360/98.08; 360/99.12
(58) Field of Search ............................... 360/98.08, 99.12

(56) References Cited

U.S. PATENT DOCUMENTS

| | | |
|---|---|---|
| 4,764,828 * | 8/1988 | Gollbach ........................... 360/98.08 |
| 5,014,142 | 5/1991 | Nakanishi et al. . |
| 5,027,242 | 6/1991 | Nishida et al. . |
| 5,216,662 | 6/1993 | Stefansky et al. . |
| 5,274,517 | 12/1993 | Chen . |
| 5,295,030 | 3/1994 | Tafreshi . |
| 5,333,080 | 7/1994 | Ridinger et al. . |
| 5,392,178 | 2/1995 | Nishio et al. . |
| 5,422,770 | 6/1995 | Alt . |
| 5,452,157 | 9/1995 | Chow et al. . |
| 5,517,376 | 5/1996 | Green . |
| 5,528,434 | 6/1996 | Bronshvatch et al. . |
| 5,880,905 * | 3/1999 | Kazmierczak ..................... 360/98.08 |
| 5,940,244 * | 8/1999 | Canlas .............................. 360/98.08 |
| 6,055,123 * | 4/2000 | Kazmierczak ..................... 360/98.08 |

* cited by examiner

Primary Examiner—A. J. Heinz
(74) Attorney, Agent, or Firm—Crowe & Dunlevy

(57) ABSTRACT

An apparatus for minimizing axial and radial displacement of discs in a disc drive having a spindle motor hub rotatable about a central axis. The hub includes a substantially cylindrically shaped mounting surface at a selected radius about the central axis. The disc spacer comprises a substantially circular body having an inner surface at a first radius greater than the radius of the mounting surface, and a plurality of inwardly-facing spindle contact features projecting from the body. Each of the spindle contact features has a spindle contact surface at a second radius less than the radius of the mounting surface, with the spindle contact surfaces being operably configured to bear against the mounting surface when the disc spacer is coupled to the spindle motor hub. Preferably, intermediate portions of the body between adjacent spindle contact features deform to urge the spindle contact features toward the mounting surface.

9 Claims, 4 Drawing Sheets

MULTI-POINT INTERFERENCE DISC SPACER FOR A DISC DRIVE

RELATED APPLICATIONS

This application claims the benefit of United States Provisional Application No. 60/070,848 entitled MULTI-POINT INTERFERENCE DISC SPACER FOR DISC DRIVE, filed Jan. 8, 1998.

FIELD OF THE INVENTION

This invention relates generally to the field of hard disc drive data storage devices, and more particularly, but not by way of limitation, to a disc spacer that minimizes axial and radial displacement of discs in a disc drive.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless direct current (DC) spindle motor. In disc drives of the current generation, the spindle motor rotates the discs at speeds of up to 10,000 revolutions per minute (rpm).

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator bearing housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator bearing housing opposite to the coil, the actuator bearing housing also typically includes a plurality of vertically aligned, radially extending actuator head mounting arms, to which the head suspensions mentioned above are mounted. When current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved radially across the data tracks along an arcuate path.

Disc drives of the current generation are included in desk-top computer systems for office and home environments, as well as in laptop computers which, because of their portability, can be used wherever they can be transported. Because of this wide range of operating environments, the computer systems, as well as the disc drives incorporated in them, must be capable of reliable operation over a wide range of ambient temperatures.

Furthermore, laptop computers in particular can be expected to be subjected to large amounts of mechanical shock as they are moved about. It is common in the industry, therefore, that disc drives be specified to operate over ambient temperature ranges of from, for instance, −5° C. to 60° C., and further be specified to be capable of withstanding operational mechanical shocks of 100G or greater without becoming inoperable.

One of the areas of disc drive design which is of particular concern when considering ambient temperature variations and mechanical shock resistance is the system used to mount the discs to the spindle motor. During manufacture, the discs are mounted to the spindle motor in a temperature- and cleanliness-controlled environment. Once mechanical assembly of the disc drive is completed, a special servo-writer is used to prerecord servo information on the discs. This servo information is used during operation of the disc drive to control the positioning of the actuator used to move the read/write heads to the desired data location in a manner well known in the industry. Once the servo information has been recorded on the discs, it is assumed by the servo logic that the servo information, and all data subsequently recorded, are on circular tracks that are concentric with relation to the spin axis of the spindle motor. The discs, therefore, must be mounted to the spindle motor in a manner that prevents shifting of the discs relative to the spindle motor due to mechanical shock applied to the host computer system.

Several systems for clamping of the discs to the spindle motor have been described in U.S. Patents, including U.S. Pat. No. 5,528,434, issued Jun. 18, 1996; U.S. Pat. No. 5,517,376, issued May 14, 1996; U.S. Pat. No. 5,452,157, issued Sept. 19, 1995; U.S. Pat. No. 5,333,080, issued Jul. 26, 1994; U.S. Pat. No. 5,274,517, issued Dec. 28, 1993; and U.S. Pat. No. 5,295,030, issued Mar. 15, 1994, all assigned to the assignee of the present invention. In each of these disc clamping systems, the spindle motor of the disc drive includes a disc mounting flange extending radially from the lower end of the spindle motor hub. A first disc is placed over the hub during assembly and brought to rest on this disc mounting flange. An arrangement of disc spacers and additional discs are then alternately placed over the spindle motor hub until the intended "disc stack" is formed. Finally, some type of disc clamp is attached to the spindle motor hub which exerts an axial clamping force against the uppermost disc in the disc stack. This axial clamping force is passed through the discs and disc spacers and squeezes the disc stack between the disc clamp and the disc mounting flange on the spindle motor hub.

From the above description, it would appear that the only element that would need to be considered when designing a disc clamping system would be the disc clamp, with any requirement for additional clamping force being met by an increase in the strength of the disc clamp. However, with the industry trend of size reduction in the overall disc drive, the size of various components within the disc drive has also been reduced, including the thickness of the discs. As the discs have grown thinner, the amount of clamping force that can be applied to the discs without causing mechanical distortion of the discs has also fallen. That is, due to inescapable tolerance variation in the flatness of the disc mounting flange on the spindle motor, the discs themselves and the disc spacers between adjacent discs, as well as the flexibility of the motor flange and other components in the stack, only a finite amount of axial clamping force can be applied to the inner diameters of the discs before the desired flatness of the disc surfaces is lost.

Furthermore, the amount of non-operating mechanical shock which the disc drive is specified to withstand is constantly being increased, with future disc drive products being considered which must be capable of operating after experiencing non-operating mechanical shocks in the range of 1000G.

In light of these facts, it is clear that improvements to the currently common practice of axially loading the disc stack to prevent shifting of the discs relative to the spindle motor hub must be provided.

SUMMARY OF THE INVENTION

The present invention provides an apparatus which minimizes axial and radial displacement of discs in a disc drive.

As exemplified by presently preferred embodiments, a disc spacer is provided to establish and maintain a desired amount of spacing between adjacent discs which are alignable about a spindle motor hub, with the spindle motor hub being rotatable about a central axis and including a substantially cylindrically shaped mounting surface at a selected radius about the central axis.

The disc spacer comprises a substantially annular body having an inner surface at a first radius greater than the radius of the mounting surface, and a plurality of inwardly-facing spindle contact features projecting from the body. Each of the spindle contact features has a spindle contact surface at a second radius less than the radius of the mounting surface, with the spindle contact surfaces being operably configured to bear against the mounting surface when the disc spacer is coupled to the spindle motor hub.

Preferably, the body further comprises intermediate portions between adjacent spindle contact features, with the intermediate portions deforming to urge the spindle contact surfaces toward the mounting surface when the disc spacer is coupled to the spindle motor hub.

The body further preferably comprises first and second disc contact surfaces disposed along planes that are substantially normal to the inner surface, and wherein the first and second disc contact surfaces bear against adjacently disposed discs, respectively, when the disc spacer is interposed between the adjacently disposed discs and the disc spacer and discs are coupled to the spindle motor hub.

The disc spacer is preferably utilized in combination with a disc clamp which mates with the spindle motor hub and exerts an axial force in a direction substantially parallel to the central axis to minimize movement of the first and second discs and the disc spacer relative to the spindle motor hub in a direction parallel to the central axis. In this manner, the disc spacer operates to prevent shifting of the discs relative to the spindle motor hub in a direction normal to the central axis.

When a number of the disc spacers are fixedly located in relationship to the spindle motor hub, the mass of the full stack of discs and spacers is prevented from reacting to applied mechanical shocks as a unit, with each disc forced to react independently, and the resistance of the discs to radial shifting in response to applied mechanical shocks is increased by a factor substantially equal to or greater than the number of discs being mounted.

These and various other features as well as advantages which characterize the present invention will be apparent from a reading of the following detailed description and a review of the associated drawings.

DETAILED DESCRIPTION

Figure 1:
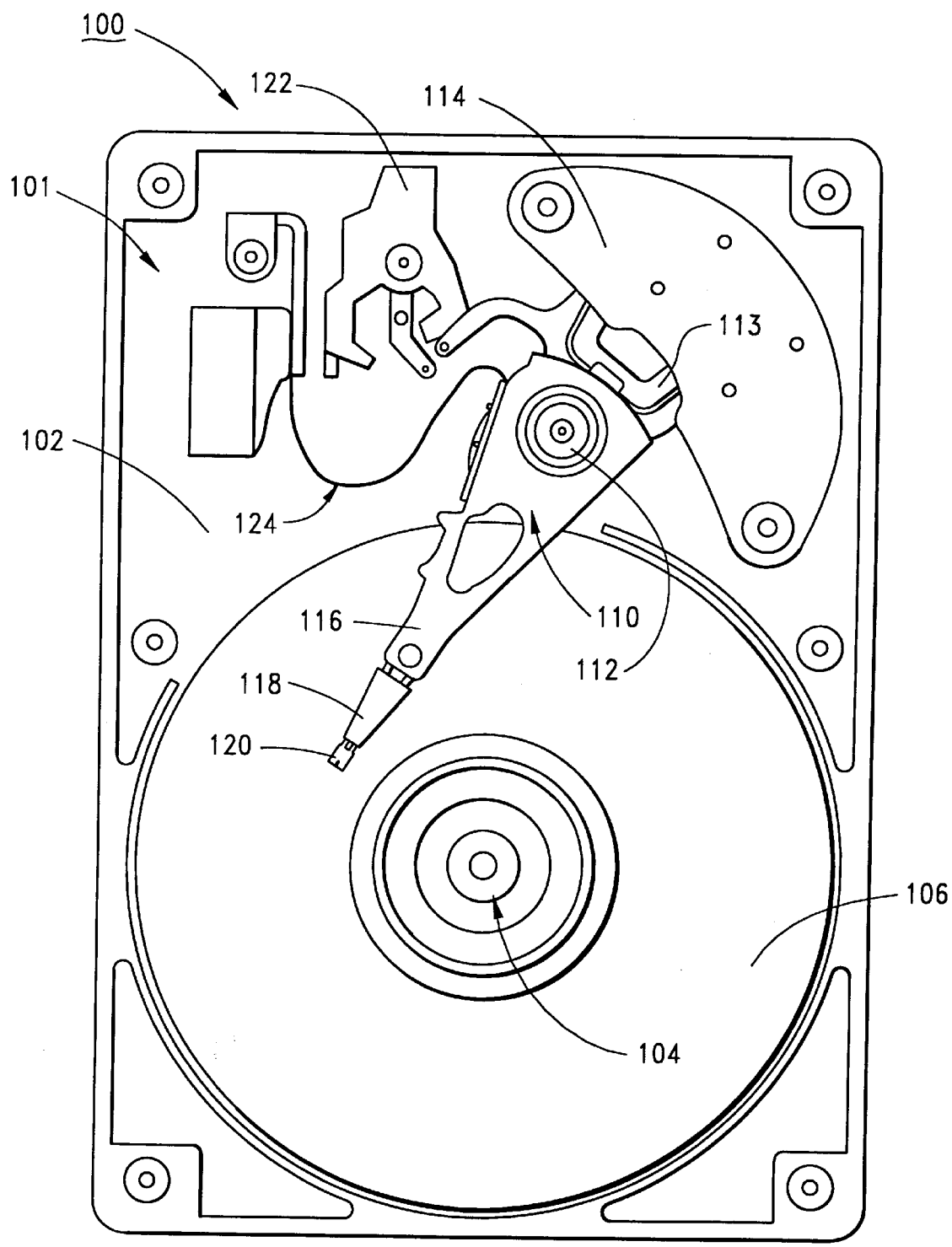
FIG. 1 is a top plan view of a prior art disc drive.

In order to set forth a detailed description of various presently preferred embodiments of the present invention, reference is first made to FIG. 1 which shows a top plan view of a prior art disc drive 100 of the type used to store computer data. The disc drive 100 includes a head-disc assembly (HDA) 101 and a printed wiring assembly (PWA) which is mounted to the underside of the HDA and is thus not visible in FIG. 1. The PWA includes electronics used to control the operation of the HDA 101.

A top cover, omitted from FIG. 1 to reveal interior portions of the HDA 101, mates with a base deck 102 of the HDA 101 to provide an environmentally controlled environment for the HDA 101. A spindle motor (generally designated at 104 ) is supported by the base deck 102 and rotates a plurality of axially aligned discs 106 at a constant high speed. A disc clamp 108 secures the discs to the spindle motor 104 in a conventional manner.

The discs include recording surfaces (not separately identified in FIG. 1) to which user data are written by way of a rotary actuator 110, which rotates about a cartridge bearing assembly 112 in response to the application of current to a coil (113, a portion of which is visible in FIG. 1) of a voice coil motor (VCM) 114. The actuator 110 includes a plurality of rigid arms 116, each of which supports a corresponding flexible suspension assembly 118. Each suspension assembly 118 in turn supports a head 120 over the corresponding disc recording surface by an air bearing established by air currents set up by the high speed rotation of the discs 106.

A latch assembly 122 secures the actuator 110 when the disc drive 100 is deactivated, and a flex circuit assembly 124 facilitates electrical interconnection between the actuator 110 and the disc drive PWA.

Figure 2:
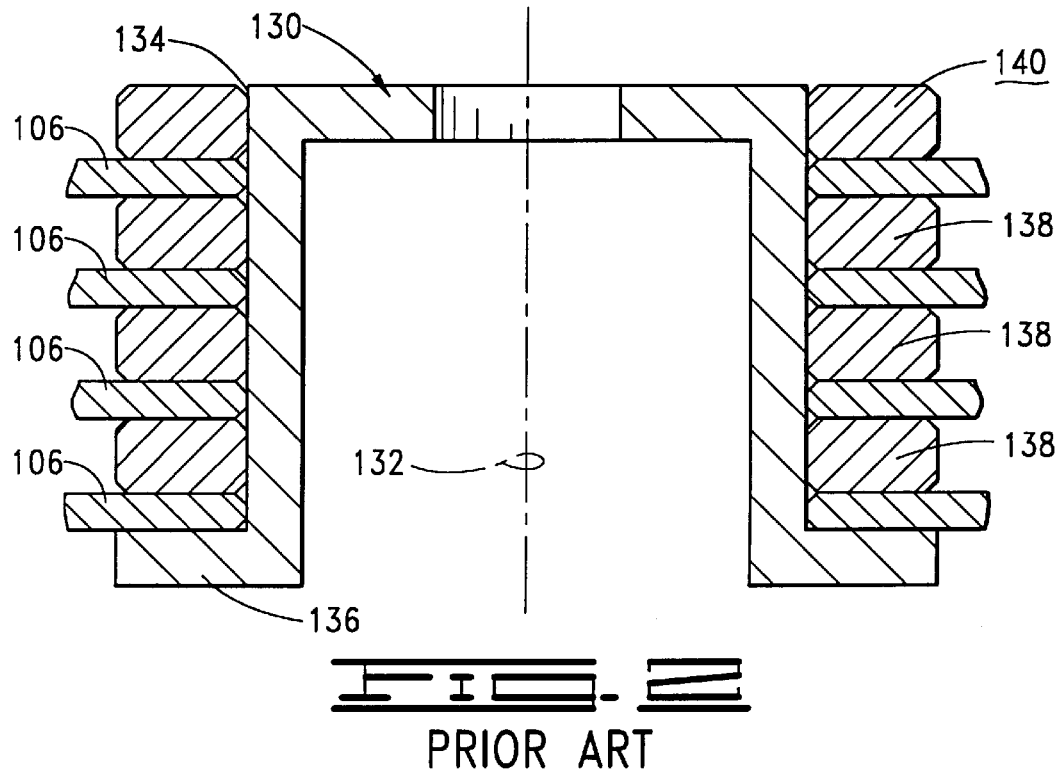
FIG. 2 is a simplified sectional elevation view of a first prior art system for mounting discs to a spindle motor hub in a disc drive such as shown in FIG. 1.

Referring now to FIG. 2, shown therein is a simplified sectional elevation view of a typical prior art disc mounting system which utilizes axial loading to secure the discs of a disc drive such as shown in FIG. 1. As set forth by FIG. 2, a hub 130 of a spindle motor (such as the spindle motor 104 in FIG. 1) is configured for rotation about a central axis 132. The hub 130 includes an exterior, substantially cylindrically shaped mounting surface 134 which is disposed at a selected radius from the central axis 132. A mounting flange 136 extends radially from the mounting surface 134 to support a plurality of discs (such as the discs 106 in FIG. 1) and spacers 138 which are clamped using a first prior art type of disc clamp 140, to be discussed below. Those skilled in the art will recognize that the electrical and magnetic components used to rotate the hub 130 (i.e., remaining portions of the spindle motor) are typically disposed within the hub, but have been omitted from FIG. 2 for purposes of clarity.

The discs 106 and spacers 138 form a disc stack which is assembled by placing a first disc over the hub 130 to rest upon the flange 136. The stack is thereafter formed by alternately placing the disc spacers 138 and remaining discs 106 over the hub 130 until the desired number of discs 106 have been positioned. The disc clamp 140 is then assembled to the uppermost portion of the hub 130 to complete the assembly. While FIG. 2 shows an example disc stack which includes four discs, those skilled in the art will appreciate that the scope of the present invention (as claimed below) includes disc stacks having both greater and lesser numbers of discs.

In FIG. 2, the disc clamp 140 is of the type referred to in the industry as a "shrink-fit clamp." Such clamps have an inner radius that is nominally smaller than the outer radius of the hub 130. Assembly is accomplished by heating the clamp 140 to cause thermal expansion great enough to allow the clamp 140 to pass over the hub 130. The designed amount of axial loading is then applied to the disc clamp 136 and the clamp 136 is allowed to cool and shrink into an interference fit with the hub 130.

Figure 3:
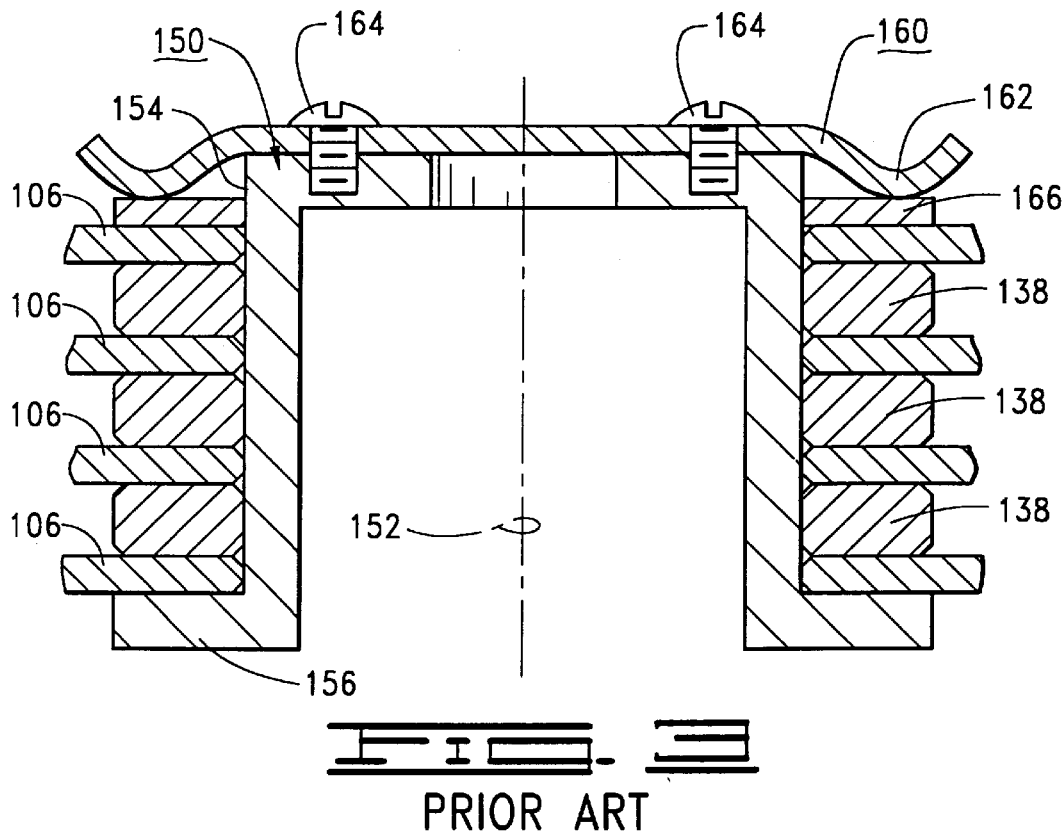
FIG. 3 is a simplified sectional elevation view of a second prior art system for mounting discs to a spindle motor hub in a disc drive such as shown in FIG. 1.

Turning now to FIG. 3, shown is a simplified diagrammatic sectional elevation view, similar to that of FIG. 2, showing a second prior art disc clamping system. For clarity, identical elements of FIGS. 2 and 3 have been provided with the same reference numerals.

FIG. 3 shows a spindle motor hub 150 which is substantially similar to the hub 130 of FIG. 2 and is configured for rotation about a central axis 152. As before, the hub 150 includes an exterior, substantially cylindrically shaped mounting surface 154 which is disposed at a selected radius from the central axis 152. A mounting flange 156 extends radially from the mounting surface 154 to support a plurality of discs 106 and spacers 138 which are clamped between the flange 156 and a second prior art type of disc clamp 160, commonly known in the industry as a "spring clamp."

The disc clamp 160 is formed from flat sheet stock having desired spring characteristics and includes a circumferential corrugation 162 closely adjacent the outer radius of the clamp which forms one or more contact surfaces (not separately designated) for exerting force upon the disc stack when a plurality of screws 164 are assembled through the clamp into threaded holes (also not designated) in the hub 150. It is also typical for disc clamping systems incorporating spring clamps (such as 160) to include a washer member 166 between the contact surfaces of the disc clamp 160 and the upper surface of the uppermost disc 106. The washer member 166 aids in evenly distributing the clamping force of the disc clamp 160 about the circumference of the mounting portion of the discs 106 and allows for slip contact between the contact surfaces of the disc clamp 160 and the washer member 166 when the screws 162 are tightened, thus preventing the exertion of radial stresses directly upon the uppermost disc 106.

As will be appreciated, selection of the material and geometry of the disc clamp 160 will generally determine the amount of axial clamping force exerted by the disc clamping system of FIG. 3. Details of typical disc clamping systems incorporating a spring clamp such as that of FIG. 3 can be found in previously mentioned U.S. Pat. Nos. 5,274,517 and 5,295,030.

Both of the two prior art disc clamping systems of FIGS. 2 and 3 share a common drawback. Specifically, since the inner radii of the discs 106 and disc spacers 138 are typically slightly larger than the mounting surfaces 134, 154 of the spindle motor hubs 130, 150 to allow for assembly ease, the discs 106 and disc spacers 138 are subject to radial displacement relative to the central axes 132, 152 of the spindle motor hub 130, 150 after assembly due to differential thermal expansion and applied mechanical shocks. Because clamping forces applied to the disc stack are in the axial direction, all resistance to such radial shifting of the discs relative to the spindle motor hub is, therefore, purely a function of the amount of applied axial force and the coefficient of friction of the disc stack components. Furthermore, since the discs 106 and disc spacers 138 are free to move as a single mass in response to the application of mechanical shocks, the amount of axially applied clamping force may not be sufficient to prevent the shifting of the discs 106 and disc spacers 138.

Figure 4:
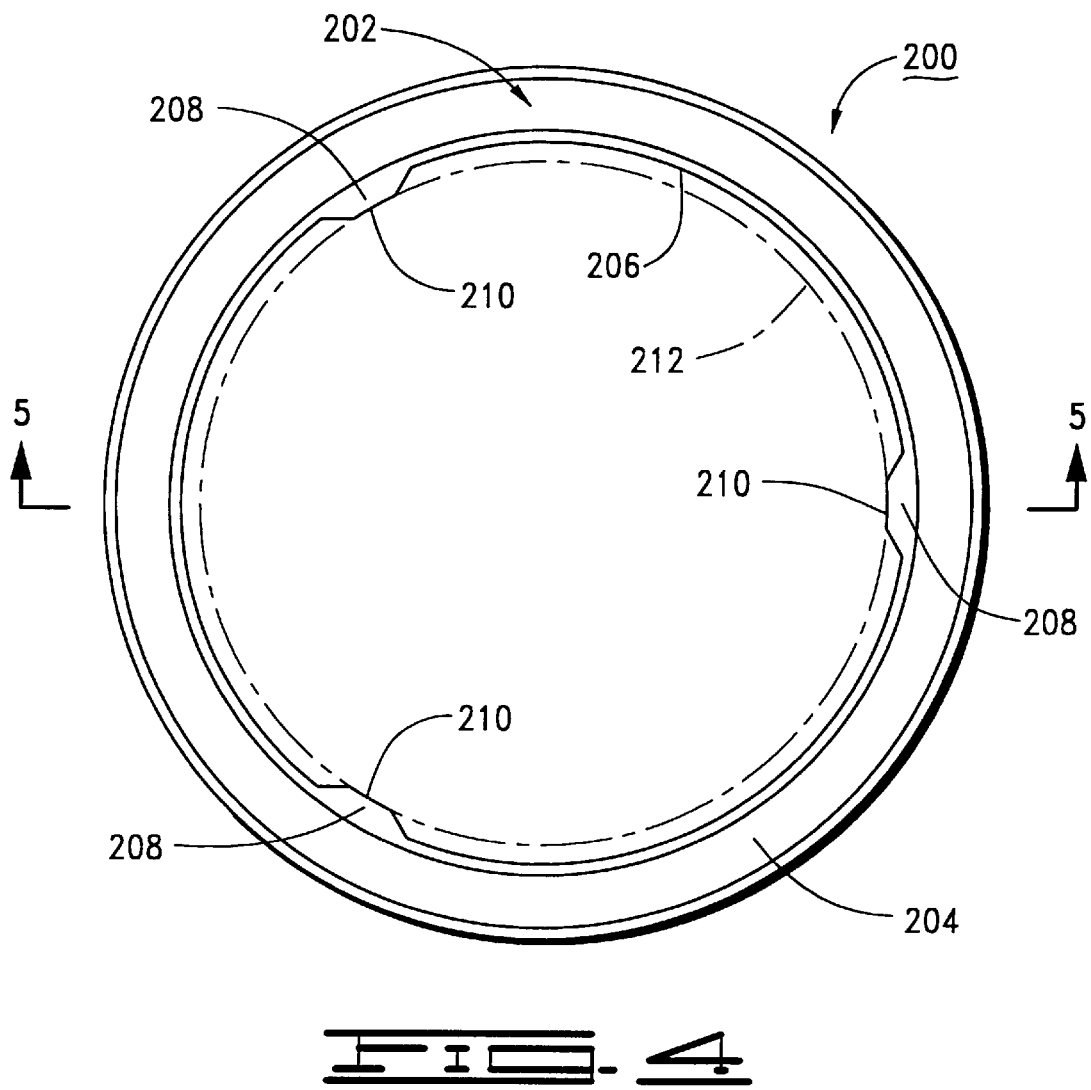
FIG. 4 is a plan view of a disc spacer constructed in accordance with a preferred embodiment of the present invention.
Figure 5:
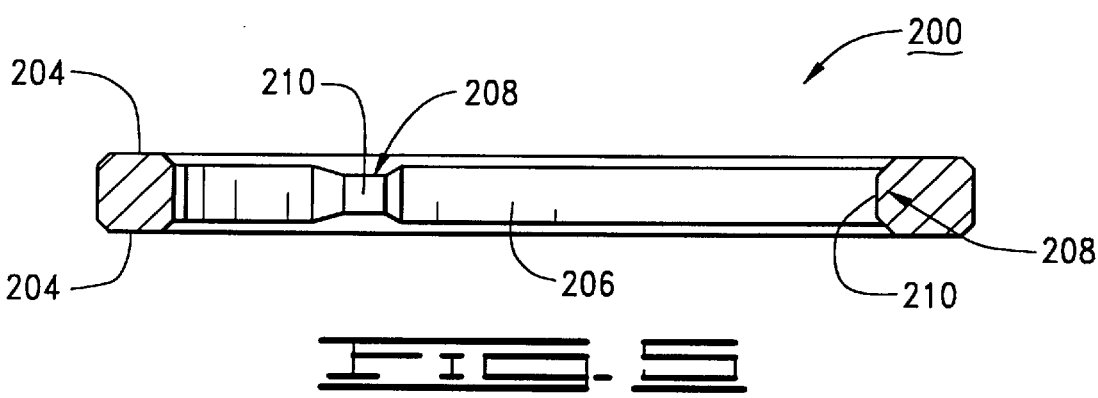
FIG. 5 is a section elevation view, taken along line 5—5 of FIG. 4, of the disc spacer of FIG. 4.
Figure 6:
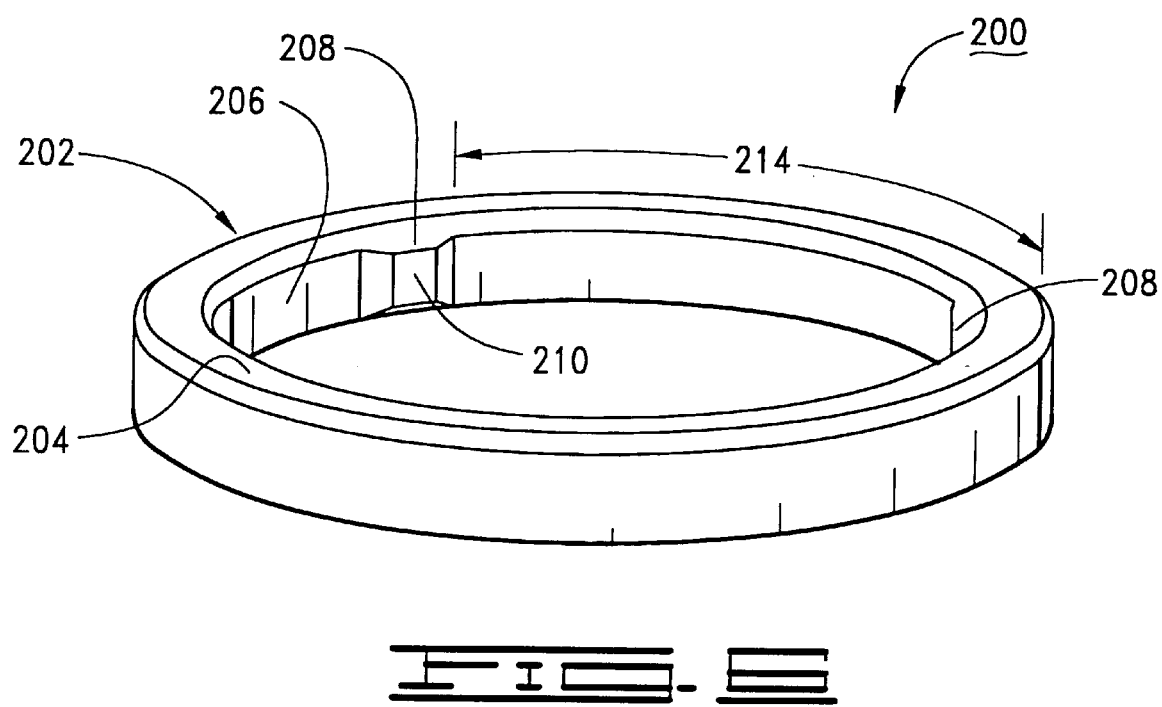
FIG. 6 is a perspective view of the disc spacer of FIGS. 4 and 5.

Turning now to FIGS. 4, 5 and 6, shown therein are plan, sectional elevation and perspective views, respectively, of a disc spacer 200 constructed in accordance with a preferred embodiment of the present invention. It will be noted that the sectional elevation view of FIG. 5 is taken along line 5—5 of FIG. 4.

As shown in FIGS. 4–6, the disc spacer 200 has a generally circular construction with a substantially annular body 202 having a pair of oppositely disposed disc contact surfaces 204 (hereinafter also referred to as "first and second disc contact surfaces") that are intended to bear directly on the inner portions of the discs 106 making up the disc stack.

The body 202 further has an inner surface 206 at a selected radius from a central axis (not separately identified) of the disc spacer 200. It will be noted that the central axis of the disc spacer 200 is intended to nominally align with the central axis of a corresponding spindle hub (such as the central axes 132, 152 of FIGS. 2 and 3, respectively) when the disc spacer 200 is attached thereto. The selected radius of the inner surface 206 is greater than the radius of the mounting surface of the corresponding spindle hub (such as mounting surfaces 134, 154 of FIGS. 2 and 3, respectively).

Projecting from the body 202 are a plurality of inwardly-facing spindle contact features 208 which are preferably evenly spaced about the circumference of the body 202. In the example disc spacer 200 shown in FIGS. 4–6, there are three such spindle contact features 208 centered 120° apart, which is a preferred embodiment, since such a configuration will be self-centering about the spindle motor hub. However, it will be understood that the scope of the present invention (as claimed below) will extend to encompass disc spacers with other numbers of spindle contact features.

Each spindle contact feature 208 has a corresponding spindle contact surface 210 disposed at a common, second radius (such as shown at 212 in FIG. 4), which is slightly smaller than the radius of the mounting surface of the spindle motor hub with which the disc spacer 200 is intended for use. Thus, when the disc spacer 200 is assembled over the spindle motor hub, the spindle contact surfaces 210 will bear against the mounting surface of the spindle motor hub. Preferably, an interference fit will be established between the spindle contact surfaces 210 and the mounting surface of the spindle motor hub, forcing intermediate portions (such as 214 in FIG. 6) between adjacent spindle contact features 208 to deform slightly, locking the disc spacer 200 in a fixed relationship to the spindle motor hub in a spring-like manner.

The disc spacer 200 thus provides a compromise between a true, totally circumferential interference fit and the prior art clearance fit. With the present invention, stresses and sensitivity to tolerances in the disc stack components are greatly reduced and axial resistance of the clamping force by the disc spacers is minimized as compared to those associated with a true, totally circumferential interference fit. Furthermore, installation can be readily accomplished without requiring a press or shrink fit operation as would be otherwise necessary with a true, totally circumferential interference fit.

The fact that the disc spacers 200 are fixedly positioned relative to the spindle motor hub means that the mass of the disc spacers 200 is decoupled from the mass of the discs 106 when the response to the application of mechanical shock is considered. That is, only the individual mass of each of the discs need be considered, since each disc will be clamped either between two radially fixed adjacent disc spacers 200, between a radially fixed disc spacer 200 and the radially extending disc mounting flange (136, 156 in FIGS. 2 and 3, respectively) or between a radially fixed disc spacer 200 and the disc clamp (140, 160 in FIGS. 2 and 3, respectively).

Those skilled in the art will realize that this, in turn, means that, for a given axial clamping force, the resistance of the discs to radial shifting due to the application of mechanical shock increases by a factor substantially equal to or greater than the number of discs 106 in the disc stack. The improvement factor, I, can more precisely be expressed by the following relationship:

$$I = \frac{\text{(mass of all discs and disc spacers in the disc stack)}}{\text{(mass of one disc)}} \quad (1)$$

which, depending on the mass of the disc spacer compared with the mass of an individual disc, can be significantly greater than the number of discs. The clamping force and, hence, the frictional resistance to radial motion, is substantially the same for the entire stack of discs and disc spacers as it is for a single disc between two spacers fixedly attached to the motor hub. The same clamping force and coefficient of friction are involved, but each disc is an isolated, separately moveable mass instead of being part of a larger mass (i.e., the total number of discs and spacers) which can move as a unit. In other words, each disc is affected as a separate unit, which results in improved resistance to radial shifting of the discs relative to the spindle motor hub.

It will now be recognized that the present invention is directed to an apparatus that minimizes axial and radial displacement of discs in a disc drive. As exemplified by presently preferred embodiments, a disc spacer 200 is provided to establish and maintain a desired amount of spacing between adjacent discs 106 which are alignable about a spindle motor hub 130, 150, with the spindle motor hub being rotatable about a central axis 132, 152 and including a substantially cylindrically shaped mounting surface 134, 154 at a selected radius about the central axis.

The disc spacer comprises a substantially annular body 202 having an inner surface 206 at a first radius greater than the radius of the mounting surface, and a plurality of inwardly-facing spindle contact features 208 projecting from the body. Each of the spindle contact features 208 has a spindle contact surface 210 at a second radius 212 less than the radius of the mounting surface, with the spindle contact surfaces being operably configured to bear against the mounting surface when the disc spacer is coupled to the spindle motor hub.

Preferably, the body further comprises intermediate portions 214 between adjacent spindle contact features, with the intermediate portions deforming to urge the spindle contact surfaces toward the mounting surface when the disc spacer is coupled to the spindle motor hub.

The body further preferably comprises first and second disc contact surfaces 204 disposed along planes that are substantially normal to the inner surface, and wherein the first and second disc contact surfaces bear against adjacently disposed discs, respectively, when the disc spacer is interposed between the adjacently disposed discs and the disc spacer and discs are coupled to the spindle motor hub.

The disc spacer is preferably utilized in combination with a disc clamp 140, 160 which mates with the spindle motor hub and exerts an axial force in a direction substantially parallel to the central axis to minimize movement of the first and second discs and the disc spacer relative to the spindle motor hub in a direction parallel to the central axis. In this manner, the disc spacer operates to prevent shifting of the discs relative to the spindle motor hub in a direction normal to the central axis.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A disc spacer which establishes and maintains a desired amount of spacing between adjacent discs which are alignable about a spindle motor hub which is rotatable about a central axis and includes a substantially cylindrically shaped mounting surface at a selected radius about the central axis, the disc spacer comprising:

a substantially annular body having an inner surface at a first radius greater than the radius of the mounting surface; and a plurality of inwardly-facing spindle contact features projecting from the body, each spindle contact feature having a spindle contact surface at a second radius less than the radius of the mounting surface, wherein each spindle contact surface is operably configured to bear against the mounting surface when the disc spacer is coupled to the spindle motor hub.

2. The disc spacer of claim 1, wherein the body further comprises intermediate portions between adjacent spindle contact features, and wherein the intermediate portions deform to urge each spindle contact surface toward the mounting surface when the disc spacer is coupled to the spindle motor hub.

3. The disc spacer of claim 1, wherein the adjacent discs are characterized as first and second discs, respectively, wherein the body further comprises first and second disc contact surfaces disposed along planes that are substantially normal to the inner surface, and wherein the first and second disc contact surfaces bear against the first and second discs, respectively, when the disc spacer is interposed between the first and second discs and the disc spacer and first and second discs are coupled to the spindle motor hub.

4. The disc spacer of claim 3, in combination with a disc clamp which mates with the spindle motor hub and exerts an axial force in a direction substantially parallel to the central axis to minimize movement of the first and second discs and the disc spacer relative to the spindle motor hub in a direction parallel to the central axis, wherein the disc spacer operates to prevent shifting of the first and second discs relative to the spindle motor hub in a direction normal to the central axis.

5. A disc drive, comprising:

a spindle motor comprising a rotatable hub having a substantially cylindrically shaped mounting surface disposed at a selected radius about a central axis;

first and second discs adjacent the mounting surface and axially aligned for rotation about the central axis; and a disc spacer, coupled to the mounting surface and interposed between the first and second discs, comprising a substantially annular body and a plurality of inwardly-facing spindle contact features each having a corresponding spindle contact surface, wherein the body nominally has an inner surface at a first radius greater than the radius of the mounting surface and each spindle contact surface nominally has a second radius less than the radius of the mounting surface, and wherein the annular body deforms when installed onto the spindle motor so that each spindle contact surface bears against the mounting surface.

6. The disc drive of claim 5, further comprising a disc clamp affixed to the spindle motor hub which exerts an axial force in a direction substantially parallel to the central axis to minimize movement of the first and second discs and the disc spacer relative to the spindle motor hub in a direction parallel to the central axis, and wherein the disc spacer minimizes shifting of the first and second discs relative to the spindle motor hub in a direction normal to the central axis.

7. The disc drive of claim 6, wherein the spindle motor hub further comprises a flange which extends radially from the mounting surface so that the first and second discs and the disc spacer are clamped between the disc clamp and the flange.

8. The disc drive of claim 6, wherein the body further comprises first and second disc contact surfaces disposed along planes that are substantially normal to the inner surface, and wherein the first and second disc contact surfaces bear against the first and second discs, respectively.

9. A disc drive, comprising:

first and second discs adjacent a mounting surface of a rotatable spindle motor hub; and a spacer which spaces the discs in a desired relationship to the mounting surface, comprising:

a substantially annular body having an inner surface at a first radius greater than a radius of a mounting surface of the spindle motor hub; and a plurality of inwardly-facing spindle contact features projecting from the body, each spindle contact feature having a spindle contact surface at a second radius less than the radius of the mounting surface, wherein each spindle contact surface is operably configured to bear against the mounting surface when the disc spacer is coupled to the spindle motor hub.

* * * * *